United States Patent [19]

Giles

[11] 4,383,602
[45] May 17, 1983

[54] UNSCRAMBLERS FOR BOWL SHAPED ARTICLES

[75] Inventor: Brian Giles, Nether Alderley, England

[73] Assignee: GOM Automation Limited, Gibraltar, England

[21] Appl. No.: 260,107

[22] Filed: May 4, 1981

[30] Foreign Application Priority Data

Mar. 24, 1981 [GB] United Kingdom ................ 8109109

[51] Int. Cl.³ ............................................. B65G 47/14
[52] U.S. Cl. ..................................... 198/396; 221/160
[58] Field of Search ................ 198/380, 392, 396, 493

[56] References Cited

U.S. PATENT DOCUMENTS

| | | | |
|---|---|---|---|
| 2,631,714 | 3/1953 | McCain | 198/392 X |
| 3,285,387 | 11/1966 | Ochs | 198/392 X |
| 3,874,740 | 4/1975 | Hurd | 198/493 X |
| 4,093,062 | 6/1978 | Sjögren | 198/380 |

Primary Examiner—John J. Love
Assistant Examiner—Paul A. Sobel
Attorney, Agent, or Firm—Oblon, Fisher, Spivak, McClelland & Maier

[57] ABSTRACT

An unscrambler, to which lightweight cup- or bowl-shaped articles such as the bottoms for plastic bottles or caps for aerosol containers, are fed prior to delivery to another, e.g. a bottle-making or cap-applying machine, for which they must all be presented right-way-up, and which are likely to become "stacked" when scrambled together, comprises a shallow, rotating dish reservoir which can be very big, e.g. up to or even more than 30 feet (10 meters) across, but which can be suspended from a roof or ceiling so as not to take up floor space. The dish has an inclined rim with an outer ledge, the articles being blown up the rim onto the ledge by an air current which puts them on the ledge right-way-up. Any articles that are stacked or not aligned properly on the ledge are removed by further air jets or mechanically.

6 Claims, 3 Drawing Figures

UNSCRAMBLERS FOR BOWL SHAPED ARTICLES

BACKGROUND OF THE INVENTION

This invention relates to unscramblers for bowl- and cup-shaped articles, such as may be produced by moulding in plastics material and intended for use as bases for plastic bottles or covers for aerosol or other spray cans or the like, all hereinafter referred to as "lightweight cup- and bowl-shaped articles".

Currently such articles are delivered from a moulding machine into a hopper-like reservoir from which they are "unscrambled" and presented to a further manufacturing process by means of an elevating conveyor that has inclined ledges or "flights". As the conveyor moves upwardly through the mass of articles in the reservoir, the articles are engaged by the ledges or flights. The elevator is so inclined that articles "correctly" engaged, i.e. with their bases against the conveyor surface, are elevated to the top of the conveyor, but articles which are incorrectly engaged fall off back into the reservoir. By "incorrectly engaged" is meant either that the articles are stacked or that their rims, rather than their bases, are facing the conveyor. Either way, the centre of gravity will lie the wrong side of the ledge or flight of the conveyor.

However, reservoirs and unscramblers of this type have numerous problems, not least among which is the problem of stacking, which is aggravated by the depth of articles which bears down on the lowermost articles in the reservoir. Also of considerable importance is the physical size of the reservoir—limited to some extent, anyway, by the packing problem that causes stacking which cannot be broken up. Should the supplying machine break down, it is necessary to hand feed the reservoir from previously reserved stocks of articles in order to keep machines downstream of the reservoir in production. This is inconvenient and expensive.

BRIEF STATEMENT OF THE INVENTION

These problems are solved by the present invention which provides, in one aspect, an unscrambler for lightweight cup- or bowl-shaped articles comprising a reservoir adapted to receive such articles delivered to it, orienting means adapted to orientate said articles in said reservoir prior to delivery from said reservoir, said reservoir comprising a shallow rotating dish having an inclined rim with an outer ledge, and blower means adapted to direct a current of air from beneath said reservoir so as to elevate single articles to said ledge.

Said reservoir may be apertured so that said blower means can direct air up through said reservoir to impinge upon any of said articles above said blower means and thus direct said articles up said rim to the outer ledge. Said blower means may be so adapted as preferentially to orientate said articles with their bases on said ledge. In the cases where said blower means in fact so orientate only a fraction (albeit, preferably, a major fraction) of said articles elevated to said ledge, further means may be provided to move mis-orientated articles from said ledge back into said reservoir. Said further means may comprise additional blower means.

The rotating dish can be quite large, for example, thirty feet (10 meters) across or more, so that it can hold a considerable number of the articles, far more than is conventionally accommodated in existing unscramblers. Different sizes, in fact. of dish may be provided for differing needs, but it is possible in any event to standardize on everything except diameter, so that the rim and ledge cross-section is comparable as between one size and another, which means that the blower arrangements and other ancillary equipment can be standard.

Because the arrangement, though it may be as large as desired, is not deep (avoiding packing problems, because there is no very great depth of articles to bear down on the bottom layer) it can be relatively light in weight even when loaded, and presents no problems in being suspended and driven in rotation from the ceiling or roof of a building, thus not taking up additional floor space—and even releasing floor space at present taken up by conventional unscramblers, as well as that taken up by the score for use in the event the unscrambler should break down.

BRIEF DESCRIPTION OF THE DRAWINGS

One embodiment of an unscrambler for lightweight cup- and bowl-shaped articles according to the invention will now be described with reference to the accompanying drawings in which.

DESCRIPTION OF THE PREFERRED EMBODIMENT

Figure 2:
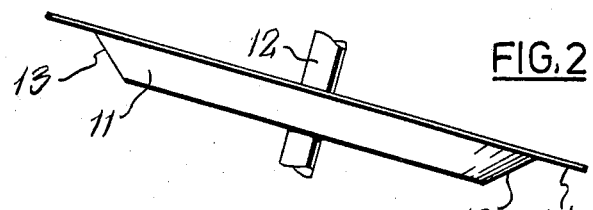
FIG. 2 is a side elevation.
Figure 1:
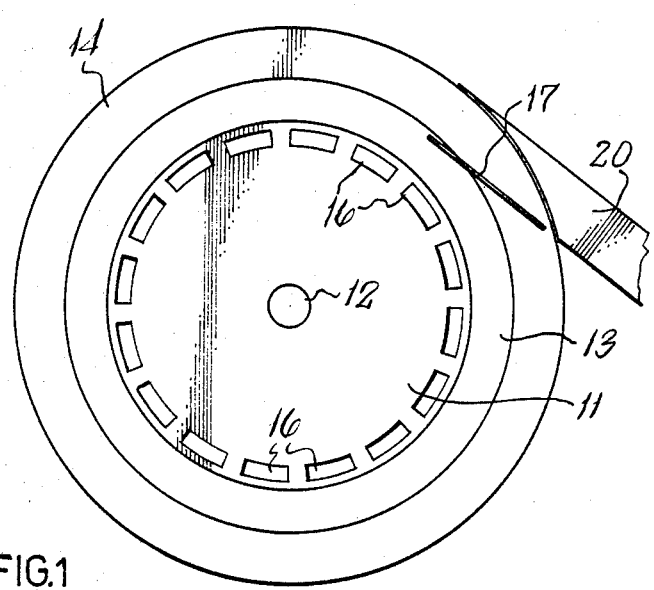
FIG. 1 is a plan view.
Figure 3:
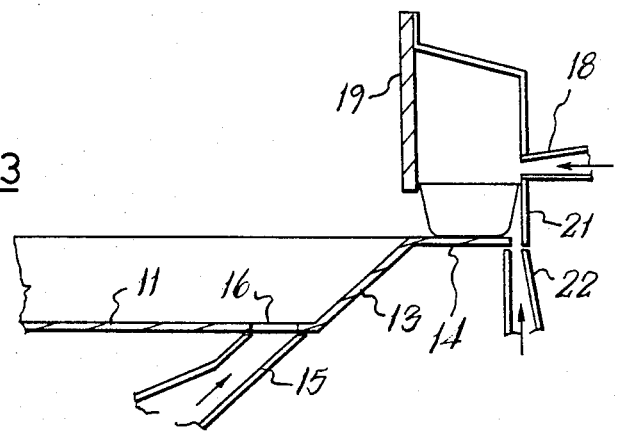
FIG. 3 is a section through the rim of the unscrambler of FIGS. 1 and 2.

The unscrambler illustrated in FIGS. 1 to 3 comprises a reservoir 11 in the form of a shallow dish suspended on a rotating shaft 12 as from a ceiling. A moulding machine (not shown) for the bases of bottles of plastic (e.g. polyester) material delivers the same into the reservoir 11 and they move or migrate to the edge thereof under the action of gravity, if the reservoir is inclined as shown, or, otherwise, as by air currents or mechanical arrangements. At the edge of the reservoir is an inclined rim 13 rising to a ledge 14. At a take-off point there is a blower 15 located beneath the reservoir 11 and directing a current of air up through apertures 16 where the rim 13 begins. The air currents preferentially induce "right-way-up" articles to float up the rim 13 to land on the ledge 14. It may be found that 80% of the articles are thus correctly elevated to the ledge 14, from where they are directed, as the dish rotates, to an outfeed conveyor 3 (which may be an air-bed conveyor) 17 by a plough arrangement 18.

Those articles that are not correctly orientated on the ledge 14 must be removed and this is done by conventional means, namely by further air blowing arrangements. One such, which deals with stacked articles and articles which are placed otherwise than right-way-up or upside down, is shown as an horizontally directed air jet 18. After this, it is necessary only to eliminate unstacked, upside down articles, which is done by guiding the articles by a plough 19 against a wall 21 with an immediately adjacent vertical blower 22. The blower 22 does not affect a right-way-up bowl, but catches under the rim of an upside down bowl and lifts it off. Articles thus rejected are simply returned to the reservoir, the excursion serving to break up any stacks.

Various modifications may be made without departing from the spirit and scope of the invention.

I claim:

1. An unscrambler for lightweight cup- and bowl-shaped articles comprising a reservoir adapted to receive such articles delivered to it, orienting means adapted to orient said articles in said reservoir prior to delivery from said reservoir, said reservoir comprising a shallow rotating dish having air passage means in its bottom and an inclined rim with an outer ledge, and blower means adapted to direct a current of air from beneath said reservoir through said air passage means so as to elevate single articles to said ledge.

2. An unscrambler as claimed in claim 1, wherein said reservoir is apertured so that said blower means can direct air up through said reservoir to impinge upon any of said articles above said blower means and direct such articles up said rim to said outer ledge.

3. An unscrambler as claimed in claim 1, wherein said blower means are so arranged as preferentially to orient said articles with their bases on said ledge.

4. An unscrambler as claimed in claim 3, wherein said blower means in fact so orient only a fraction of said articles elevated to said ledge, and further means are provided to move mis-orientated articles from said ledge back into said reservoir.

5. An unscrambler as claimed in claim 4, wherein said further means comprise additional blower means.

6. An unscrambler as claimed in any one of claims 1 to 5, in which said rotary dish is of the order of 30 ft across.

* * * * *

UNITED STATES PATENT AND TRADEMARK OFFICE
CERTIFICATE OF CORRECTION

PATENT NO. : 4,383,602
DATED : May 17, 1983
INVENTOR(S) : BRIAN GILES

It is certified that error appears in the above-identified patent and that said Letters Patent is hereby corrected as shown below:

In column 2, line 17, delete "score" and insert therefor --store--;

In column 2, line 25, delete ":" and insert therefor --;--.

*Signed and Sealed this*

*Twenty-first* Day of *August 1984*

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,383,602
DATED : May 17, 1983
INVENTOR(S) : Brian Giles

It is certified that error appears in the above-identified patent and that said Letters Patent is hereby corrected as shown below:

On the title page;
At Item [73], after "Gibraltar", delete --England--.

Signed and Sealed this

Sixteenth Day of July 1985

[SEAL]

Attest:

DONALD J. QUIGG

Attesting Officer     Acting Commissioner of Patents and Trademarks